Nov. 13, 1956  E. H. WILKENS  2,770,006
HIDE-STRIPPING DEVICES
Filed June 8, 1955
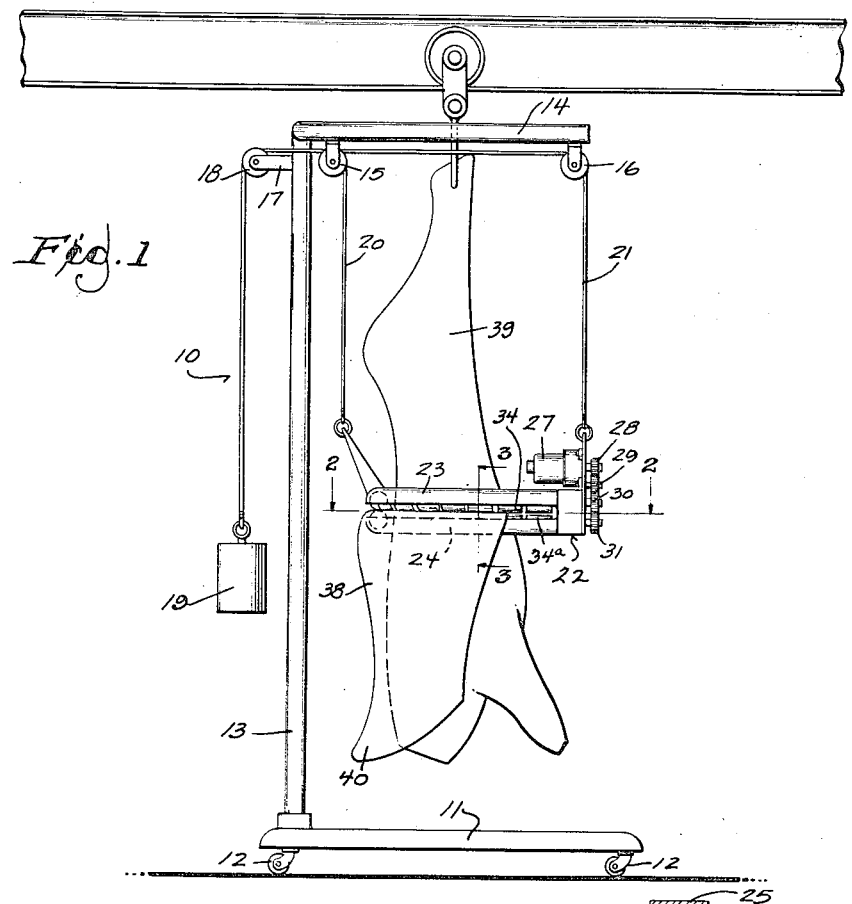
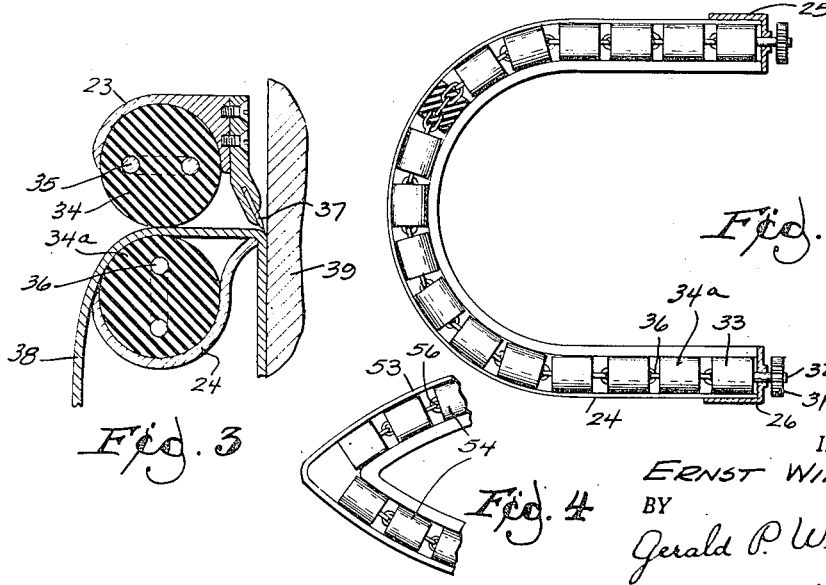
INVENTOR.
ERNST WILKENS
BY
Gerald P. Welch
ATTORNEY

United States Patent Office 2,770,006
Patented Nov. 13, 1956

2,770,006

HIDE-STRIPPING DEVICES

Ernst H. Wilkens, Milwaukee, Wis.

Application June 8, 1955, Serial No. 513,939

1 Claim. (Cl. 17—21)

This invention relates to improvements in hide-stripping devices and more particularly to a novel hide-stripping device adapted for calf skinning in a packing establishment.

An object of the invention is to provide an arrangement of resilient rollers between which a hide can be inserted and removed from the carcass by rotation of the rollers.

Another object of the invention is to combine a resilient roller assembly with a knife for separating the hide from the carcass.

Other and further objects of the invention will appear as the description proceeds, reference being had to the accompanying drawing, in which:

Fig. 1 is a view in elevation of a hide-stripping device embodying the invention.

Fig. 2 is an enlarged cross-sectional view on line 2—2 of Fig. 1 with parts broken away.

Fig. 3 is an enlarged vertical sectional view taken on line 3—3 of Fig. 1.

Fig. 4 is a fragmentary plan view of a modified lower trough element.

Referring more particularly to the drawings, the numeral 10 refers to the device generally, comprising a platform 11 on a plurality of castors 12, carrying an upright standard 13 supporting a horizontal element 14 to which are subjoined a pair of pulleys 15 and 16. A bracket 17 extends horizontally from the upright 13 and carries a pulley 18.

A weight 19 is suspended from cables 20 and 21. Cable 20 runs over pulley 18 and the pulley 15. Cable 21 runs over pulleys 18 and 16. Both cables support the frame 22 which comprises two opposed channels 23 and 24 fastened to end angle members 25 and 26, each of which carries a motor and reduction gear 27 connected by gear means 28, 29 and 30 to a gear 31 fixed to a shaft 32 embedded in the end roll 33 of a chain 34a of resilient rolls molded on the metal chains 35 and 36 held within the channels 23 and 24.

Knife means 37 are fastened to the upper channel 23 in a position to cut the hide 38 from a carcass 39 as shown in Fig. 3.

In use, the frame 22 is pulled to the high level and the upper end 40 of the hide 38 is introduced manually between the roll chains 34 and 34a. Activation of the motors 27 will pull the hide from the carcass 39 with the aid of the knife means 37. In Fig. 4 a modified form of trough is shown in which a modified V-shaped trough 53 carries two roll chains 54 molded on the metal link chains 56.

It will be understood that the device is capable of many modifications in structure and design, without departing from the spirit of the invention, within the scope of the appended claim.

Having thus described the invention, what is claimed and desired to be secured by Letters Patent of the United States, is:

In a device of the character described, a horizontal frame mounted for vertical movement, a pair of horizontal opposed troughs, a plurality of cylindrical resilient rolls disposed in two chains rotatable within said troughs, for receiving therebetween a hide to be pulled from a carcass hanging within said frame, and knife means on one trough adapted to cut the hide from said carcass.

References Cited in the file of this patent

UNITED STATES PATENTS

| 1,334,694 | Dufresne et al. | Mar. 23, 1920 |
| 1,419,895 | O'Neill et al. | June 13, 1922 |
| 2,477,289 | Moss | July 26, 1949 |